United States Patent [19]

Bollier et al.

[11] Patent Number: 4,828,721
[45] Date of Patent: May 9, 1989

[54] PARTICULATE DETERGENT COMPOSITIONS AND MANUFACTURING PROCESSES

[75] Inventors: Marc M. P. Bollier, Argenteau; Arthur H. Gray, Embourg; Andreas J. Somers, Tongeren, all of Belgium

[73] Assignee: Colgate-Palmolive Co., Piscataway, N.J.

[21] Appl. No.: 187,102

[22] Filed: Apr. 28, 1988

[51] Int. Cl.$^4$ .............................................. C11D 3/12
[52] U.S. Cl. ...................................... 252/8.7; 252/8.6; 252/140; 252/174; 252/174.25; 252/550; 252/558
[58] Field of Search ..................... 252/174.25, 8.6, 8.7, 252/140, 550, 558, 174, 174.13; 427/212

[56] References Cited

U.S. PATENT DOCUMENTS

| | | | |
|---|---|---|---|
| 4,419,250 | 12/1983 | Allen | 252/174.25 |
| 4,472,287 | 9/1984 | Ramachandran | 252/174.25 |
| 4,488,972 | 12/1984 | Weinstein | 252/174.25 |
| 4,524,012 | 6/1985 | Wixon | 252/174.25 |
| 4,536,316 | 8/1985 | Ramachandran | 252/174.25 |
| 4,569,773 | 2/1986 | Ramachandran | 252/174.25 |
| 4,582,615 | 4/1986 | Ramachandran | 252/174.25 |
| 4,605,506 | 8/1986 | Wixon | 252/174.25 |
| 4,609,473 | 9/1986 | Ramchaandran | 252/174.25 |
| 4,699,729 | 10/1987 | Parr | 252/174.25 |

*Primary Examiner*—Paul Lieberman
*Assistant Examiner*—Hoa Van Le

*Attorney, Agent, or Firm*—Bernard Lieberman; Murray M. Grill

[57] ABSTRACT

A particulate detergent composition, preferably of relatively high bulk density, comprises agglomerate particles of clay, such as bentonite, and anionic synthetic organic detergent, of particle sizes in a certain desired range, with each particle thereof comprising individual particles of such clay of a smaller size and anionic detergent absorbed into said particles, on the surfaces thereof and between them, whereby a relatively high bulk density fabric softening detergent composition is obtainable. Such detergent composition is very desirably manufactured by a process in which bentonite or other suitable clay powder is agglomerated into detergent composition particles of desired size by agglomerating such powder with an aqueous medium containing a detersive proportion (for such detergent composition or for a built laundry detergent composition which may be made from it) of anionic synthetic organic detergent, in a process in which excess water from such aqueous medium, which could cause the agglomerate to be sticky and poorly flowing, is removed from the surfaces of the agglomerate particles by absorption, hydration and/or drying during and/or after the agglomeration process. The agglomerate particles are useful in making built detergent compositions by being blended with particulate builder particles, which are often spray dried and can be of relatively high bulk density too.

20 Claims, 2 Drawing Sheets

PARTICULATE DETERGENT COMPOSITIONS AND MANUFACTURING PROCESSES

This invention relates to particulate detergent compositions. More particularly, it relates to detergent compositions which comprise bentonite agglomerated with anionic synthetic organic detergent. Processes for manufacturing such compositions are within the invention and the bentonite-anionic detergent agglomerates can be made into built heavy duty laundry detergent compositions of desired high bulk density.

It is known in the art to manufacture clay agglomerates and bentonite agglomerates and to incorporate them in particulate detergent compositions. In such compositions bentonite exerts a fabric softening effect (by adhering to laundry fibers and "lubricating" such fibers, causing them to yield to the touch and feel soft). In some instances clay or bentonite would be incorporated in an aqueous crutcher mix, with detergent and builder salts, and that mix would be spray dried to particulate form. However, it has been found that due to the presence in the crutcher mix of the detergent, such as anionic synthetic organic detergent, usually of the sulfate or sulfonate type, such particulate built fabric softening laundry detergents would usually be of comparatively low bulk density, normally being of a bulk density in the range of 0.2 to 0.4 g./cc. Such bulk density can be increased if one makes the final built detergent composition by mixing comparatively finely divided powdered components, but such mixes are often objectionably dusty and can be irritating if breathed by a user of the product. Also, the resulting products are often unattractive in appearance and may be aesthetically unsatisfactory. When anionic synthetic organic detergent is omitted from the detergent composition formula and is replaced by normally solid nonionic detergent, which is sprayed in liquid state onto spray dried builder salt beads (which cah be of relatively high bulk density), products of desirable high bulk density are obtainable. However, such can suffer from the absence of anionic detergent, which is useful in laundry detergent compositions for its cleaning effects on various soils and stains which are often found on laundry to be washed.

The prior art, as referred to above, and subsequently, does not suggest any solution to the problem of manufacturing a high bulk density particulate anionic detergent composition containing clay or containing bentonite as a fabric softening agent. The present invention relates to such a product, and to a process for its manufacture, which are effective, reproducible, and especially efficient because the unbuilt detergent composition made can be manufactured directly from bentonite and aqueous anionic detergent solution and/or suspension. Furthermore, any tendency of the bentonite to gel, as in a crutcher mix, does not cause any problems in practicing the present processes, and the particulate detergent composition made, which may desirably be blended with particulate builder or particulate builder composition, can be of desired high bulk density, freely flowable and of good bead strength, and allows production of a built particulate detergent of similar good characteristics. Additional benefits of the invention are in the direct use of anionic detergent solution or suspension without any preliminary drying and in the use of bentonite as a carrier for such detergent. Furthermore, when only the builder composition is spray dried, in accordance with the invention, spray tower capacity is less of a limiting factor on production rates.

In accordance with the present invention a particulate detergent composition comprises agglomerate particles of clay (preferably fabric softening bentonite) and anionic synthetic organic detergent, with each particle comprising individual particles of clay of smaller sizes, and said anionic detergent being absorbed into said smaller clay particles, on the surfaces thereof and between them. Preferably, the clay is a fabric softening bentonite, the anionic detergent is of the sulfate or sulfonate type and the agglomerate particles are of relatively high bulk density (0.5 g./cc. or higher) Also within the invention is a process for manufacturing such a particulate detergent composition by agglomerating such clay with an anionic synthetic organic detergent that is dissolved and/or dispersed in an aqueous medium, and removing at least some of the water supplied by the aqueous medium from the surfaces of the agglomerated particles by absorption thereof into the agglomerated bentonite-detergent particles, hydration of the bentonite and any other hydratable materials present with it, and/or drying of the agglomerate particles during formation thereof or afterward. The invented particulate detergent composition can be made into a corresponding built detergent composition, which comprises a mixture of a detersive and fabric softening proportion of the previously described particulate fabric softening detergent composition particles, (the bentonite-anionic detergent agglomerate) and a building proportion of particulate builder (preferably spray dried) for the anionic synthetic organic detergent of such agglomerate.

At applicants' assignee's research and development facilities and in its manufacturing plants, efforts have been made to produce bentonite agglomerates and detergent composition agglomerates. Sometimes bentonite was agglomerated with the aid of a binding agent, such as an aqueous solution of sodium silicate, sodium sulfate or sodium carbonate, and sometimes bentonite powder and other components of desired detergent compositions were co-agglomerated. However, although extensive work was done in this field, and although it was known to be desirable to manufacture denser particulate solid detergent compositions, before the present invention it was not known to utilize aqueous solutions or suspensions of anionic detergents as "binders" for clay or bentonite or together with any such clay or bentonite, to make agglomerate beads which could be utilized to manufacture built particulate anionic detergent compositions, such as those of high bulk density. Furthermore, it was not known that one could also obtain the advantage of employing an aqueous solution or suspension of the anionic detergent directly, in the form in which it is normally produced, without requiring a separate preliminary drying operation to remove excess water from it.

A search of selected patents and patent applications in applicants' assignee's files has disclosed brief mentions in U.S. Pat Nos. 4,488,972 and 4,582,615 of agglomerating sprays that may sometimes include nonionic detergents and other materials, which sprays can be employed to agglomerate bentonite powders. Also at page 17 of patent application Ser. No. 368,736, of Ramachandran and Parr, filed Apr. 15, 1982 (which has been abandoned, but for which corresponding foreign specifications have been published), it is mentioned that bentonite powder may be agglomerated onto spray dried detergent beads and that the agglomerating spray utilized may be water or aqueous solutions of various other materials, including surface active agents. At page 18 of such specification it is mentioned that an aqueous solution of anionic detergent or a liquid state nonionic detergent may be sprayed onto detergent composition base particles before mixing thereof with bentonite. However, such disclosures are not considered especially relevant to the present invention because aqueous solutions of anionic detergents are not described or suggested therein for agglomeration of the bentonite or other suitable clay component of detergent compositions. The reference at page 18 of Ser. No. 368,736 is to a post-spraying of detergent onto detergent composition particles, which absorb the detergent. Thus, this reference is not to agglomeration of bentonite powder with an aqueous solution of anionic detergent.

The clay employed in making the detergent compositions of this invention is preferably a fabric softening bentonite. Such bentonite is swellable and is normally in the form of sodium bentonite but non-swelling bentonites may also find use, such as calcium and magnesium bentonites, and sometimes it may be economically advantageous to use them. In some cases, such non-swelling bentonites may have been previously converted by suitable treatment, as with sodium carbonate, to swellable sodium bentonites, to increase their fabric softening activities, and in other instances the calcium and/or magnesium bentonites may be utilized and may be converted to swelling bentonite, such as sodium bentonite, by sodium carbonate, or other suitable alkaline material, which may also be present in the invented built detergent compositions. Such conversion may be effected during the agglomeration process or in other preliminary treatment, or it may occur in the wash water. Instead of bentonite, other smecties and montmorillonites may be employed, as may be other clays, such as kaolins, although in many such instances such clays do not possess the very desirable fabric softening properties of bentonite, and therefore function principally as carriers for the anionic detergent. Among sources of fabric softening bentonites and other clays there may be mentioned Industria Chimica Carlo Laviosa, American Colloid Company, Industrial Division, and Georgia Kaolin Company, some suitable bentonites of which are sold under the Laviosa ™ AGB, American Colloid ™ and Mineral Colloid ™ designations, respectively. Such bentonites are also described in British patent specification No. 1,400,898 and in U.S. Pat. No. 4,419,250, the disclosures of which are hereby incorporated by reference. Such fabric softening bentonites will desirably contain a moisture content of at least 3%, which helps to maintain the bentonite in desired crystalline form, in which form crystalline laminae thereof readily slide past each other. When the bentonite is held to fibrous surfaces, after deposition on laundry material fibers during washing, it makes the dried fibers feel lubricated and soft to the touch. Bentonite and other useful clays are available in different finenesses and for the purposes of the present invention it is desirable to employ a bentonite or clay powder that will pass through a No. 140 sieve (U.S. Sieve Series), with it being preferred for it to pass through a No. 200 sieve and more preferably, through a No. 325 sieve.

The anionic detergent component of the invented agglomerates is an anionic synthetic organic detergent, which is usually employed in a soluble salt form, preferably as a sodium salt. Although other types of anionic detergents may be utilized, such as sodium higher fatty acyl sarcosides, the preferred water soluble synthetic organic anionic detergents employed are those which are described as of a sulfonate or sulfate type, which may be designated as sulf(on)ates. Such include linear higher alkylbenzene sulfonates (preferred), higher fatty alcohol sulfates, higher fatty alcohol polyethoxylate sulfates, olefin sulfonates and paraffin sulfonates. An extensive listing of anionic detergents, including such sulfate and sulfonate detergents, is given at pages 25 to 138 of the text *Surface Active Agents and Detergents*, Vol. II, by Schwartz, Perry and Berch, published in 1958 by Interscience Publishers, Inc., and is incorporated herein by reference. Usually the higher alkyl group of such detergents is of 10 to 18 carbon atoms, preferably 12 to 15 carbon atoms, and the ethoxylate contents of such detergents that are ethoxylated will preferably be in the range of 3 to 30 ethoxy groups per mole. When the anionic detergent is the highly preferred higher alkylbenzene sulfonate, the higher alkyl will preferably be linear and of 12 to 13 carbon atoms, and the cation thereof will be sodium.

In making the compositions of the present invention all that is necessary is for the powdered bentonite to be suitably contacted by the aqueous medium containing the anionic detergent, as by a spray of detergent solution, while the bentonite particles are in motion, so that the particles may be agglomerated, with the anionic detergent and the aqueous medium for it acting to promote such agglomeration. The detergent effectively reduces surface tension and thereby assists in wetting the bentonite, speeding intimate contacts, which favors agglomeration. The anionic detergent may be in the form of a solution, which is preferable, or a dispersion (or a mixture of such two) in the aqueous medium, and preferable the aqueous medium will be that resulting from manufacture of the detergent. It is known that after sulf(on)ation and neutralization of detergent acid, in an aqueous medium, the reaction mixture will contain the sulfate or sulfonate detergent in neutralized form, usually as a sodium salt, but will also contain sodium sulfate. To aid in the separation of the detergent salt from the sodium sulfate a lower alcohol is often employed to extract the detergent. Thus, the detergent solution, even after separation from the aqueous sodium sulfate phase and removal of alcohol by distillation, may still contain some alcohol in an aqueous solution or solution/dispersion of detergent. Whether or not such alcohol is present, aqueous medium containing the detergent may be directly sprayed onto a moving bed, cloud or screen of bentonite particles in a suitable apparatus, details of which will be referred to later, to make the desired agglomerate. In such manufacturing process, utilizing the detergent "solution" as is, any excess water and/or alcohol which may be present helps to speed agglomeration but the resulting agglomerates may subsequently be dried to remove such liquids and thereby to improve the flowability of the product and to diminish any tendency for particles to stick together or cake on storage.

Although the particulate detergent composition of the invention needs to contain only the anionic synthetic organic detergent and clay, in desired agglomerate form, optionally it may also contain water, binder (which also usually serves as a strengthener for the particles) and adjuvants. Among the binders which may be utilized are various water soluble inorganic salts, such as sodium silicate (preferably of a $Na_2O:SiO_2$ ratio in the range of 1:1.6 to 1:3.0, more preferably 1:2 to 1:2.8, and most preferably about 1:2 or 1:2.4), sodium carbonate and sodium sulfate. Also useful are various organic polymers, some of which also may function as builders to improve detergency. Included among such polymers may be mentioned sodium carboxy-lower alkyl celluloses, sodium lower alkyl celluloses and sodium hydroxy-lower alkyl celluloses, such as sodium carboxymethyl cellulose, sodium methyl cellulose and sodium hydroxypropyl cellulose, polyvinyl alcohols (which often also include some polyvinyl acetate), polyacrylamides, polyacrylates and various copolymers, such as those of maleic and acrylic acids. Molecular weights for such polymers vary widely but most are within the range of 2,000 to 100,000. One such polymer, sold under the trademark Sokalan ® CP5, is the sodium salt of a copolymer of maleic and acrylic acids in which the ratio of such moieties is within the range of 1 to 10 to 10 to 1, and for which the molecular weight is in the range of 60,000 to 70,000. Such copolymer, in a proportion which may be utilized in the present compositions, is used to improve detergency, soil anti-redeposition, processing characteristics and bead strength of the detergent compositions made, in addition to promoting agglomeration, and such effects are achieved without adversely affecting the softening actions of the detergent compositions on laundry being washed.

Various adjuvants that may be incorporated in the invented detergent compositions, either by suitable addition in the manufacturing process or in the aqueous detergent medium sprayed onto the clay, are those that are well known in the art, which, despite the presences of only relatively minor proportions, impart desirable characteristics to the final product. They include, but are not limited to chelating agents or sequestrants, e.g., EDTA, colorants, perfumes, optical brighteners, stabilizers, antioxidants, anti-redeposition agents and soil release promoters. However, often most of such adjuvants will be incorporated in the builder composition portion of the built detergent composition or will be post-added to the product, so that the agglomeration process can be better controlled (without the adjuvants having any effects on it).

The described detergent-bentonite agglomerate may be employed as made, or may be utilized as a detersive component of various detergent compositions, including hard surface cleaners, scouring cleansers and bleaching detergent compositions, but it will preferably be the detersive (and fabric softening) component of a built detergent composition, in which case it will be mixed with a builder composition, the builder of which improves the detersive action of the anionic detergent component of the agglomerate. Such builder composition may be in spray dried bead form, having been spray dried from an aqueous crutcher mix of the components thereof, but it is within the broader aspects of the present invention to agglomerate all the product compositions or to mix components or sub-combinations of components of the builder composition with the detergent/bentonite agglomerate particles, and it is also within the invention to post-add other components of the final composition to the mix, without any spray drying being required.

The principal builders which may be components of the builder composition are water soluble inorganic salt builders, preferably sodium salts, such as sodium polyphosphates, e.g., sodium tripolyphosphate and sodium pyrophosphate, sodium carbonate, sodium bicarbonate, sodium sesquicarbonate, sodium silicate, sodium sesquisilicate and sodium borate. In addition to the water soluble inorganic salts, water insoluble builders may also be useful, including the ion exchanging zeolites, such as Zeolite 4A. Organic builders may be employed but usually will not be subjected to spray drying if they are heat sensitive, as most of them are, in which case they will normally be post-added (if their presences are considered to be desirable). Among suitable organic builders are polyacetal carboxylates, such as are described in U.S. Pat. No. 4,725,455, and water soluble salts of lower hydroxycarboxylic acids, such as sodium citrate and sodium gluconate. Various polymeric materials, some of which were previously mentioned in this specification as suitable organic binders, also may possess building functions for anionic detergents. It will be noted that water soluble silicates and carbonates, which were previously said to be useful binders for the agglomerates, also may serve as builders. When such compounds are employed in the agglomerate it is considered that their function is binding or bead strengthening and when they are present in spray dried builder composition beads or in builder compositions of other types they will be considered as builder components, although it is recognized that they will still perform the additional functions.

Although the builder is the only required component of the builder composition portion of the built detergent composition of this invention other materials will normally also be present in such compositions. Sodium sulfate, while often characterized as a filler, and as a byproduct of the neutralization of detergent acid, often helps to improve the quality of spray dried beads by strengthening them, diminishing any tendency to cake, and by improving or helping to maintain desired flowability. When it is used as a binder for the agglomerate the final built detergent will also be improved in such respects due to its presence. Fluorescent brighteners, such as distilbene sulfonates, which are well known in the art, are usually heat stable and therefore are often incorporated in the builder composition. Similarly, chelating agents, such as EDTA (ethylene diamine tetraacetic acid) may also be present. Adjuvants of the types previously mentioned for the agglomerate may also be included in the crutcher mix to be converted to spray dried builder composition beads, providing that they are sufficiently heat stable, but even those which are not heat stable may be post-added or may be included in mixed builder compositions which are not to be subjected to spray drying conditions or otherwise to be heated sufficiently to cause deteriorations. Sometimes it may be desirable to limit foaming of the built detergent composition and in such case a sodium higher fatty acid soap, such as sodium stearate, sodium tallowate or sodium coco-tallowate, or a silicone or phosphoric acid ester (PAE) may be incorporated in the crutcher mix, usually in relatively minor proportion.

Another "adjuvant" which may be employed is nonionic detergent, such as a condensation product of a higher fatty alcohol or of an alkylphenol with a lower alkylene oxide, such as ethylene oxide or a mixture of ethylene oxide and propylene oxide. In such nonionic detergent the higher fatty alcohol will normally be of 12 to 15 carbon atoms and the alkyl of the alkylphenol will usually be of 7 to 9 carbon atoms, and there will usually be present from 3 to 20, preferably 6 to 11 moles of ethylene oxide per mole of higher fatty alcohol, or 3 to 20 moles of ethylene oxide per mole of middle alkylphenol. Such nonionic detergent, in liquid state (usually at elevated temperature), may be oversprayed onto spray dried base builder composition beads, when such are employed, to be absorbed by them.

Other adjuvants which could be adversely affected by heat or by wetting may be post-added to the mixture of agglomerate and builder composition and even stable adjuvants may be conveniently post-added, when desired. Among such post-adjuvants may be mentioned: bleaches, such as sodium perborate; enzymes, such as proteolytic and amylolytic enzymes; antifoams, such as silicones and PAE's; solubilizing agents and buffers; flow aids, such as siliconates and magnesium silicate powder; and perfumes. Sometimes it may also be desirable to color the final composition, as by spraying a dilute solution of dye onto the surfaces thereof. Usually the bleach, perfume and flow aid will be post-added to the composition near the end of the manufacturing process. Of course, although water is not an essential component of the builder composition (or of the detergent composition or of the final product) it will usually be present, too, in relatively minor proportion, usually in "bound" rather than "free" state, and often in hydrated salts.

The following descriptions of proportions of components in the bentonite-linear higher alkylbenzene sulfonate detergent (LAS) agglomerates apply also to bentonite agglomerates with other anionic detergents and to clay agglomerates with such detergents. In such agglomerates the proportion of LAS will be in the range of 5 to 40% although, if desired, one could make agglomerates containing as little as 0.5% and as much as 50% of LAS, by adjustment of proportions of other components in the agglomerate formulation, and by suitable changes in the processes. Preferably the content of LAS will be 8 to 30% and in a particularly preferred formulation it will be about 22%. The proportion of bentonite in such agglomerate will usually be in the range of 50 to 95%, preferably being 60 to 85% and most preferably, for a very desirable formulation, it is about 70%. With the two main components there may be present from 0 to 20% of a combination of binder, adjuvants and water, and when binder is present the proportion thereof will desirably be in the range of 0.5 to 10%, preferably 1 to 5% and for a preferred formulation, about 2%. The water content of the finished agglomerate will usually be in the range of 1 to 10%, preferably 2 to 8%, and for a preferred formulation, about 4%. Adjuvant content will usually be minimized in the agglomerate and often will be limited only to a dye, in very small proportion, usually less than 0.1%. Often, as for undyed materials, the adjuvant content may be 0%. However, it is within the invention to utilize larger proportions of adjuvants but such will normally not exceed 10% and desirably will be less than 5%.

In the agglomerates the proportion of bentonite to LAS will normally be in the range of 1:1 to 10:1, preferably in the range of 2:1 to 8:1, more preferably 2:1 to 5:1, and for a most preferred agglomerate formulation, it is 3.2:1.

The particle sizes of the LAS-bentonite agglomerates will usually be such as will pass through a No. 8 sieve and rest on a No. 120 sieve, preferably being in the 10 to 100 sieves range, and more preferably in the 10 to 80 sieves range, but particle sizes throughout the range of No's. 6 to 140 sieves may also be useful in particular instances. The bulk densities of the products, when high bulk density products are desired, will normally be at least 0.5 g./cc., preferably being at least 0.6 g./cc. and more preferably at least 0.7 g./cc. The practical upper limit on bulk density is about 1.0 g./cc. so a more preferred range is 0.7 to 1.0 g./cc. However, although it is a significant aim of the present invention to make high bulk density detergent compositions and built laundry detergent compositions, in some instances it may be desirable intentionally to produce similar compositions but of lower bulk density, and such compositions, although not considered to be as advantageous as the higher bulk density products, are not excluded from the scope of this invention.

The built particulate detergent compositions of this invention include primarily the LAS-bentonite type agglomerate (such terminology may be used herein as a short reference to clay-anionic detergent agglomerates broadly) and builder composition, but various other functional components, which also may be referred to as adjuvants, may be present, too. The built detergent composition is preferably made by mixing together certain proportions of LAS-bentonite agglomerate and spray dried builder composition but a "dry mixed" or agglomerated rather than a spray dried builder composition, may be used instead. Various supplemental adjuvants and functional components may be post-added to the built detergent mixture or may be omitted, among which are bleaches, enzymes, anti-caking agents, flow aids, solubilizers, buffers, colorants and perfumes, but normally perfume will not be omitted.

The particulate builder composition employed, which is presently preferably spray dried (but for which mixes and agglomerates may also be employed) and which is to be mixed with the LAS-bentonite agglomerate (and with other adjuvants and functional components), will normally include 40 to 100% thereof of builder for the anionic synthetic organic sulf(on)ated detergent and 0 to 60% of a total of binder(s), filler(s), adjuvants and water. Preferably such builder composition will include 40 to 90% of builder, 0 to 40% of filler, 1 to 20% of water and 0 to 35% of adjuvants, and more preferably it will comprise 40 to 70% of sodium tripolyphosphate, 2 to 10% of sodium silicate, with the proportion of polyphosphate to silicate being in the range of 5–20:1, 10 to 35% of sodium sulfate filler, 5 to 20% of water and 1 to 30% of adjuvants. In highly preferred compositions the content of inorganic builder salt composition beads will be 50 to 60%, including both sodium tripolyphosphate and sodium silicate, in 7-15:1 proportion, and the beads will also include 20 to 30% of sodium sulfate, 10 to 20% of water and 2 to 8% of adjuvants. In a specific preferred formula such builder composition is spray dried and comprises about 50% of sodium tripolyphosphate, about 25% of sodium sulfate, about 5% of sodium silicate, about 5% of nonionic detergent (here considered to be an adjuvant, which is preferably high fatty alcohol ethoxylate of 4 to 20 moles of EtO per mole), which is post-sprayed onto the spray dried builder beads, and about 12 or 15% of water.

When the spray dried (or otherwise made) builder composition particles are mixed with the LAS-bentonite agglomerate particles the proportions employed will be a building proportion of the former and a detersive proportion, preferably a detersive and fabric softening proportion, of the latter. Normally such proportions will be 40 to 95% and 5 to 60%, respectively, preferably being 50 to 90% and 10 to 50%, more preferably being 65 to 85% and 15 to 35%, and still more preferably 70 to 80% and 20 to 30%, respectively, with a preferred embodiment of the invention also including 10 to 25%, on a total composition basis, of sodium perborate mixed in with the previously described mixture.

The particle size ranges and bulk densities for the spray dried builder compositions, and desirably also for builder compositions prepared by other processes, will preferably be like those previously recited for the LAS-bentonite agglomerate. Products of such sizes and bulk densities are considered to be well suited for dispensing from dispensing compartments of automatic washing machines equipped with automatic chargers for charging detergent composition to the wash water.

The LAS-bentonite and other clay-anionic detergent agglomerates of this invention are made by agglomerating particles of bentonite or clay and LAS or anionic synthetic organic detergent, which detergent is in an aqueous medium, such as that medium resulting from neutralization of detergent acid, followed by extraction and solvent removal. In such agglomeration process the bentonite is mixed with the LAS, as by spraying atomized particles of an aqueous medium containing such detergent onto moving bentonite surfaces, and during that process the bentonite is agglomerated into larger particles, with the detergent and the aqueous medium promoting such agglomeration. Thus, the water accompanying the detergent does not make the mixture pasty or liquid, but allows agglomeration to take place. If too little water is present in the aqueous detergent medium additional water may be added to allow atomization, or the mix may be heated to thin it sufficiently. During the agglomeration process water is absorbed into the particles and thereby is removed from the surfaces thereof. Also, the bentonite may be further hydrated by the water, thereby reducing free water content. In another embodiment of the process the agglomerating apparatus may be subjected to heat, as by blowing hot air through it, which further helps to dry the agglomerate during the agglomeration process. Of course, the mentioned mechanisms for removing water from the surfaces of the agglomerated particles may also be used after formation of the particles, as in instances where absorption and hydration are comparatively slow and in which heat drying is a subsequent operation.

The processes of this invention are readily understandable by reference to the accompanying drawing, in which.

Figure 1:
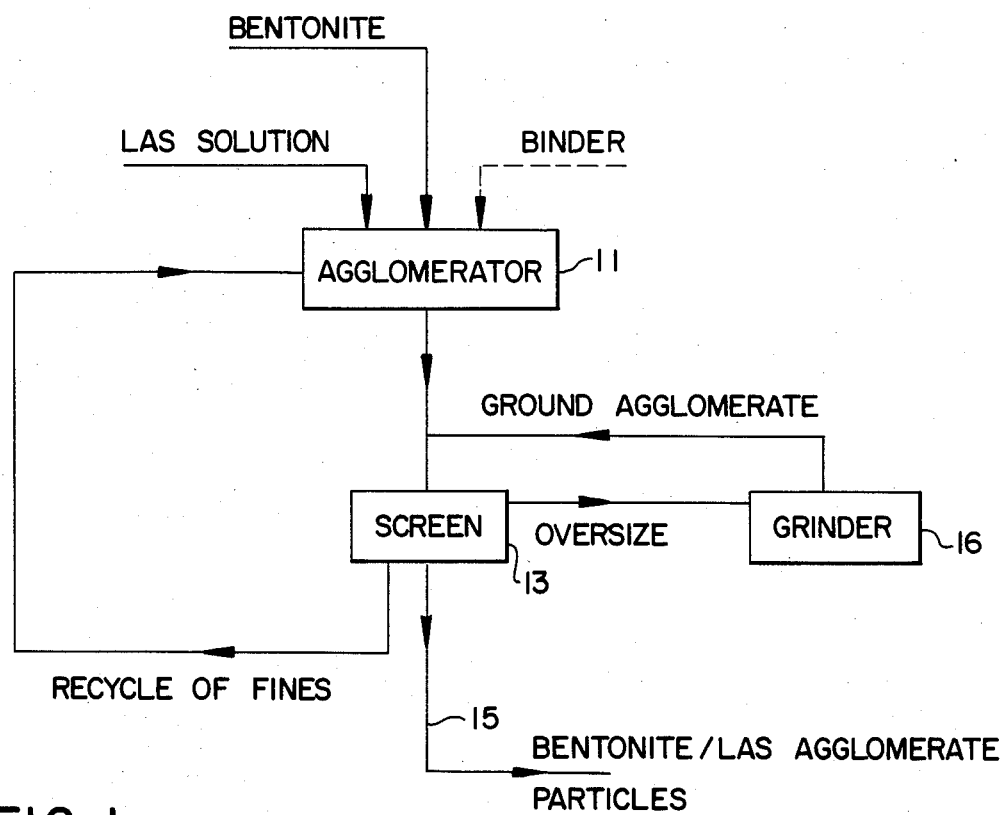
FIG. 1 is a generalized flow diagram illustrating essentials of applicable agglomeration processes.

In FIG. 1 there is illustrated, in simple form, a general process for manufacturing the bentonite/LAS and clay-/anionic detergent agglomerate particles of the present invention, wherein off-specification product is recyled, and thereby conserved. The addition of bentonite and LAS solution to an agglomerator 11, together with optional binder, is shown, and from the agglomerator the agglomerated product is illustrated as passing to a screening device 13, which separates off-specification materials from the particles of the desired sizes. The desired product passes from the screening device 13 to storage or to the next step in the manufacturing process, through line or other means 15. Additional operations on the agglomerate may be conducted between the agglomerator 11 and screen 13 or subsequent to the screening but the main features of the invented process are illustrated in FIG. 1. Normally the addition of bentonite to the agglomerator will precede the spraying of the LAS solution and binder solution (if binder is employed) onto moving surfaces of the bentonite, and usually the LAS solution and binder solution will be sprayed through atomizing nozzles onto the bentonite particles so as to obtain even distributions thereof throughout the charge of bentonite. In some instances the LAS solution may be diluted to promote better spraying and/or sometimes it may be heated to assist in accomplishing that. The binder solution can be omitted when the agglomerator is of the tumbling drum or O'Brien mixer type but is usually found to be very useful in producing a product of desired characteristics when agglomeration is conducted in a fluidized bed-type apparatus. Agglomeration in agglomerator 11 may be carried out simultaneously with a drying operation, to remove any excess water, but when hydration of the bentonite (and any other hydratable materials present) and absorption of the water by the particulate solid are sufficient or when subsequent drying is to be effected, heating of the agglomerator may be omitted. When employed, such heating may be of air passing through the agglomerator and/or of the walls and/or internal elements thereof.

Sometimes, as when the agglomeration process is subject to accurate control, or when particle size specifications are not severe, the screening operation may be omitted, but normally it will be found to be highly desirable to ensure that the product obtained will be satisfactory for its intended use. Oversized agglomerate passes from the screen arrangement to grinder 16 and thence back to screens 13, as illustrated. Fines from screening device 13 return to agglomerator 11 and thence back to the screens, after having been increased in size. Thus, with the apparatus illustrated there is no waste and all ultimate product is within particle size specifications.

As illustrated, the process for manufacturing the present bentonite/LAS agglomerate particles may be either batch or continuous. Continuous processes are preferred but require more controls to make them operate successfully, so for low budget manufacturing plants batch operations will often be more feasible. However, products produced by both methods are substantially the same in appearance and in detersive and fabric softening properties, whether employed as produced or as components of other detergent compositions, such as particulate heavy duty built laundry detergent compositions, scouring cleansers, wall and floor cleaners, fabric softeners and wash cycle additives. Apparatuses for producing such final detergent compositions are not illustrated in the drawing because it is considered that the mixing operations employed to make them from the invented bentonite/LAS agglomerates need not be parts of the invented processes, and because basically, such operations involve primarily only physical mixings of particulate components, and other treatments that are well known in the art.

Figure 2:
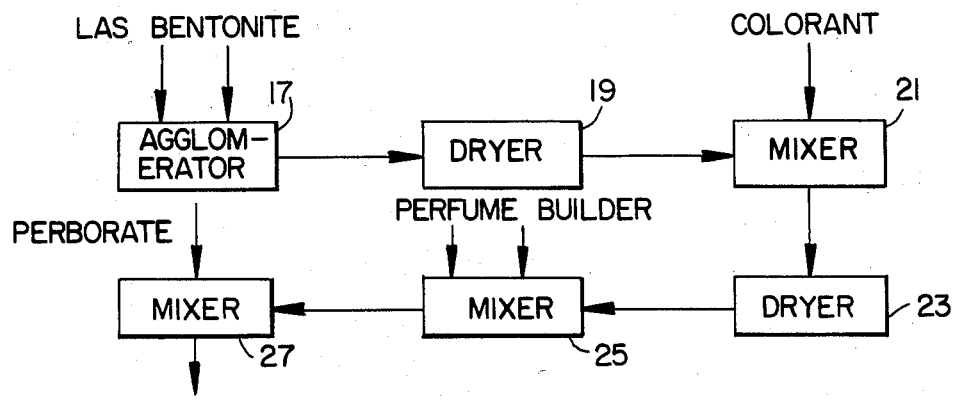
FIG. 2 is a flow diagram illustrating an agglomeration process effected in a suitable agglomerating apparatus, such as an inclined drum or an O'Brien-type mixer, followed by incorporating the agglomerate into a laundry detergent composition.

In FIG. 2 an LAS solution is sprayed onto a moving bed of bentonite, preferably in an O'Brien-type agglomerator 17, but other agglomerators, such as inclined drum agglomerators, may also be employed. The product, containing some excess water from the LAS solution, is dried in dryer 19 and is delivered to mixer 21, where a colorant solution, preferably an aqueous dye solution, is sprayed onto it as it is being mixed. It will usually be desirable to remove the moisture added with the colorant solution so the colored product is dried in second dryer 23, from which it may be transported to mixer 25. If the agglomerate beads need strengthening a strengthening binder solution may be sprayed onto them before or after coloring and drying or the strengthening solution may be applied in the same mixer as the colorant solution (or such solutions may be combined). The strengthened particles may be dried thereafter, if desirable. Builder composition particles are then added to the bentonite/LAS agglomerate in mixer 25 to produce a built laundry detergent product, which is subsequently perfumed in the same mixer. Other adjuvants and functional components, such as enzyme powder, flow aid and anti-foam silicone, may be added too, or such materials may subsequently be added in final mixer 27, wherein a substantial proportion of powdered bleach (sodium perborate) can be admixed, if desired, to produce a bleaching particulate laundry detergent composition.

Figure 3:
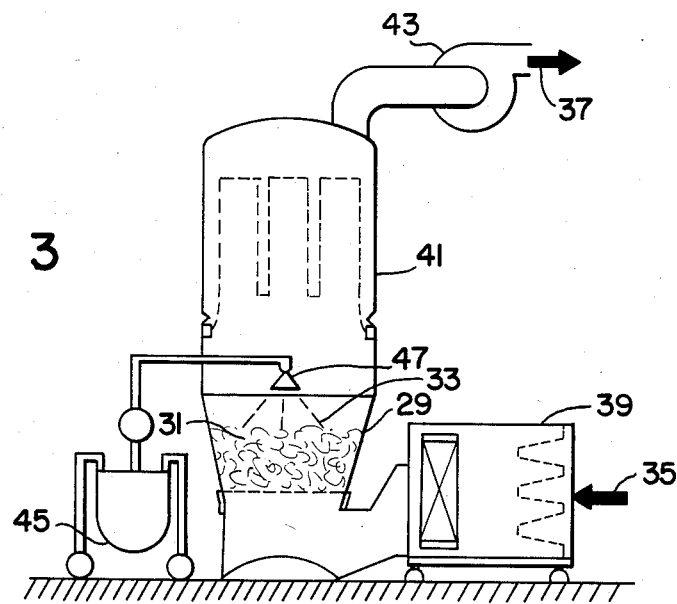
FIG. 3 is a schematic representation of an agglomeration process for agglomerating bentonite with anionic detergent in aqueous medium, utilizing a fluidized bed agglomerator.

FIG. 3 illustrates the employment of a fluidized bed agglomerator 29 in which a fluidized bed 31 of bentonite particles is contained and in which an LAS spray 33 is directed onto such fluidized particles by spray head 47. The passage of air through the apparatus is represented by arrows 35 and 37. Such air may be dehumidified and/or heated in air treatment unit 39, after which it passes into the fluidized bed agglomerator 29 and upwardly in such agglomerator to maintain the bentonite particles in fluidized state, and then is filtered in filtration unit 41 and is exhausted from such unit and into the atmosphere by blower 43. The aqueous LAS solution is pumped from tank 45 through spray head 47 onto the fluidized bed of bentonite particles and such particles are agglomerated in the fluidized bed apparatus. In instances when the LAS solution by itself is not sufficiently effective in agglomerating the bentonite particles a separate sprayer (not shown) is employed to introduce a binder solution, such as sodium silicate solution or water soluble organic polymer solution, into the agglomerating apparatus, or such binder may be mixed with the LAS solution in tank 45 and sprayed with it onto the fluidized bed of bentonite particles. In the batch operation illustrated when the desired extent of agglomeration has been achieved the air flow is cut off, the agglomerated product is removed from the agglomerating apparatus and such product is subjected to further processing and formulating, if desired.

Figure 4:
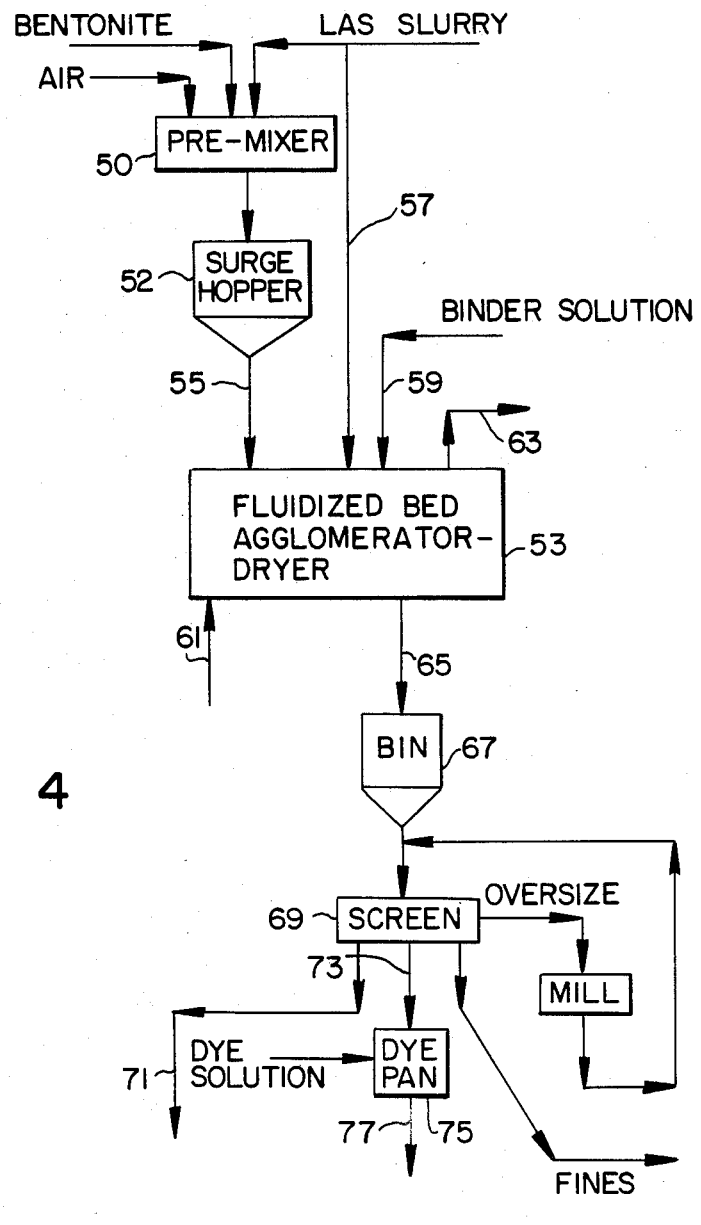
FIG. 4 is a flow diagam for bentonite-LAS agglomeration, employing equipment like that of FIG. 3.

In FIG. 4 bentonite powder and LAS slurry (or solution) are added to a pre-mixer 50, into which air is also blown to keep the mix in motion and to allow the LAS to wet the surfaces of the bentonite and to be at least partially absorbed by it. The mixed product is fed through a surge bin or hopper 52 to fluidized bed agglomerator-dryer 53, together with additional LAS slurry, through lines 55 and 57, respectively. Also, to promote agglomeration binder solution is added to the agglomerator through line 59. Both the LAS slurry and the binder solution are atomized and sprayed onto the fluidized bed of bentonite particles. Preferably, air entering the agglomerator (through line 61) is heated but it is at a lower temperature during the overspraying and agglomerating period than it is after agglomeration has been accomplished, and drying is being effected. The outlet temperature of the exhausted air, which leaves the agglomerator-dryer through line 63, will be about the same during agglomeration and during most of drying, but may rise toward the end of the drying cycle. Agglomerated and dried product is removed, as indicated, at 65, is sent to bin 67, and is screened by screen assembly 69. Particulate agglomerated product of desired particle sizes is removed from screen assembly 69, as indicated, at 71 and 73. Oversized product is milled and returned to the screen, as illustrated, and undersized product is recycled to the fluidized bed agglomerator-dryer, as indicated. Some of the correctly sized particles may be removed from the screen at 73 and may be dyed in dye pan 75, from which they may be removed, as represented by arrow 77, and another portion of the product of desired sizes may be removed at 71 in natural or uncolored state. Thus, plain or colored products may be made, and if desired, such may be blended, to form a mixed color or speckled product.

In the process of this invention for manufacturing particulate fabric softening detergent compositions powdered clay (bentonite) and liquid anionic detergent (LAS solution/dispersion) are agglomerated together to the desired particle size, and water from the LAS solution is removed from the surfaces of the agglomerated particles by one or more of three mechanisms, absorption into the agglomerate, hydration of the bentonite and of any other hydratable materials present with it and/or drying of the agglomerate. Such events can take place during the agglomeration process or afterward. The clay or bentonite employed is that previously described in the specification, the particle sizes of which are small enough to pass through a No. 140 sieve, preferably through a No. 200 sieve and more preferably through a No. 325 sieve. The anionic detergent or LAS will be in solution and/or dispersion in an aqueous medium, and preferably will be in solution in water, and the concentration thereof will be in a suitable range, desirably 30 to 60%, preferably 40 to 50%, but other concentrations can be employed, too. However, when too much water is present in the aqueous medium, instead of producing an agglomerate, a pasty mass can result and when too little water is present insufficient agglomeration can take place.

In some instances, as when the agglomerator is a fluidized bed apparatus, it is highly desirable to employ a binder to assist in the agglomerating process. Such binders have previously been described, and may be either inorganic or organic. In addition to promoting agglomeration the binders usually contribute to particle or bead strength and hardness so sometimes they may be applied after agglomeration to increase the strength and to harden the surfaces of the agglomerate particles. When applied as a separate solution the binder or strengthener will usually be of a concentration of 0.5 or 1 to 35 or 50%, in water, preferably 2 to 30%, e.g., about 4%, and in some instances, about 25%. The concentration of the solution and the amount employed will often depend on the particular type of binder being utilized, such as whether it is inorganic or organic. Thus, it may be desired to employ sodium silicate at a concentration in the range of 0.5 to 5% in water whereas acrylic-maleic acids copolymer may desirably be utilized at concentrations in the range of 20 to 30%, and 0.5 or 1 to 25 or 30% will normally be used.

The temperature of the detergent solution is desirably elevated to promote free flow thereof and to increase speed of wetting of the bentonite by it. Similarly, the binder solution may be heated. Use of elevated temperature also promotes removal by evaporation of any excess moisture added in the LAS and binder solutions (and also in the colorant medium). Desirable temperature ranges are 40° to 70° C., with 50° to 60° C. being preferable. However, it is within the invention to utilize room temperature solutions, too.

The proportions of bentonite and anionic detergent were previously recited in this specification and such are those employed in the invented processes. Similarly, the particle sizes of the agglomerates and their bulk densities were previously given. When binder or bead strengthener is employed the proportion applied, based on the weight of the agglomerate, is desirably 0.05 to 5%, preferably 0.2 to 3%, for each such application.

As previously stated, different agglomerating apparatuses may be employed and in some instances no binder is needed during agglomeration. However, often such a binder will be employed subsequently as a bead strengthener, in the same proportions previously mentioned for its use in the agglomeration operation, whether or not an agglomerating binder had previously been utilized.

Whether agglomeration is effected in batch processes or continuously the time allowed for it will normally be from 20 min to 3 hrs., and often will be in a range of ½ or 1 to 1½ or 2 hours, although it is expected that continuing research efforts to decrease such agglomeration times will ultimately be successful. Because agglomerating apparatuses vary in design, size and operating characteristics no particular rotational speeds, air pressures or other features will be specified herein but each of such apparatuses will be utilized according to what are considered as normal operating procedures. Application of dye after agglomeration, which is optional, will be satisfactorily effected by applying only a very small percentage of dye to the agglomerate, with such percentage normally being in the range of 0.001 to 0.5%, preferably 0.01 to 0.3%. Application will normally be from a dilute solution of dye, such as a dye at a concentration of about 0.001 to 2%, preferably 0.01 to 1%, in water. Dryings of the dyed product and of the agglomerate will be to such extent that any subsequent intentional addition of water to the product during processing will not make it objectionably pasty and will not interfere with further agglomeration or other treatment. Usually the water content of the agglomerate will be 5 to 35%, preferably 8 to 30%, during processing. After processing and any final drying, the moisture content of the agglomerate will normally be in the 2 to 15% range, preferably in the 4 to 12% range, e.g., 4%, 5%, 8%. As was mentioned in the description of the drawing, a preferred drying is effected with fluidized bed dryers, such as those manufactured by Aeromatic, Inc. Among preferred grinders used are Stokes granulators, and vibrating screens employed were manufactured by Sweco, Inc.

The builder composition that is blended with the agglomerate of this invention had previously been described, as were proportions employed. Such builder composition, which is preferably in spray dried bead form, with the beads being of particle sizes and bulk densities the same as those of the agglomerates of this invention, is merely mixed or blended with the bentonite/LAS agglomerate particles to make a built particulate laundry detergent composition. Of course, as was described previously, various adjuvants may be included in the spray dried builder composition, and nonionic detergent in liquid state at elevated temperature may be sprayed onto such builder composition particles, to be absorbed by them, after which the resulting builder composition may be blended with the agglomerate particles. Various other adjuvants for the built detergent composition may be mixed with the builder composition prior to mixing with the agglomerate particles or may be mixed with the built detergent compositions. Desirably, any such adjuvants to be employed in significant proportions, will be of particle sizes and bulk densities the same as those of the agglomerate and the spray dried builder composition beads. Thus, for bleaching additives, such as sodium perborate tetrahydrate, which may constitute from 10 to 25% of the final product, preferably being about 15% thereof, it is preferred that the particles be in globular bead form and of the same sizes as the particles of the rest of the composition. However, finely powdered sodium perborate can be substituted and it has been found that it does not usually objectionably segregate from the rest of the composition during transportation and storage before use, which may be attributed to its adhering to surfaces of the agglomerate particles. Normally perfumes and flow aids, such as magnesium silicate powder, will be the last adjuvants that will be sprayed or dusted onto the otherwise "final" composition particles. The various mixings and sprayings that have been described herein may be effected with the mixing, agglomerating and spraying equipment previously described, and illustrated in the drawing. Further agglomerations will not occur during such admixings of adjuvants (unless conditions are modified to intentionally promote such agglomerations) because there will not be enough liquid present with the particles, so the only effect will be mixing, in normal situations.

The following examples illustrate but do not limit this invention. Unless otherwise indicated, all parts and percentages therein and throughout the specification and claims are by weight and all temperatures are in ° C.

EXAMPLE 1

Utilizing apparatus such as that represented by FIG. 1 for the agglomeration, screening and grinding operations and utilizing apparatus such as represented by FIG. 2 for the rest of the manufacturing process, with some modifications, there is made a high density particulate anionic detergent composition of the following formula:

| Component | Percent |
| --- | --- |
| Sodium linear dodecylbenzene sulfonate | 4.7 |
| Bentonite (No. 325 sieve swellable, Italian bentonite treated with sodium carbonate, obtained from Industria Chimica Carlo Laviosa) | 15.2 |
| Sodium tripolyphosphate | 30.2 |
| Sodium sulfate | 15.0 |
| Sodium silicate | 3.0 |
| Nonionic detergent (condensation product of one mole of $C_{12-15}$ fatty alcohol with 11 moles of ethylene oxide) | 3.0 |
| Sodium perborate tetrahydrate | 15.1 |
| EDTA | 0.1 |
| Fluorescent brightener (distilbene sulfonate type) | 0.2 |
| Proteolytic enzyme (Alcalase ® 2T) | 0.3 |
| Phosphoric acid ester | 1.0 |
| Flow aid (Thixolex, ® magnesium silicate) | 1.0 |
| Maleic-acrylic acids copolymer (Sokolan CP-5) | 0.5 |
| Dye (blue) | 0.01 |
| Perfume | 0.5 |

-continued

| Component | Percent |
|---|---|
| Water | 10.19 |
| | 100.00 |

To make the bentonite/LAS agglomerate, from which the built bleaching anionic detergent composition of the above formula is made by blending the agglomerate with spray dried builder composition and post-adding other components, 100 kilograms of the bentonite is loaded into an O'Brien mixer, which is employed as an agglomerator, and the bentonite is oversprayed with an aqueous slurry of sodium linear dodecylbenzene sulfonate which contains 50.4% of such detergent, 3.4% of sodium sulfate, and the balance of water (sometimes with a minor proportion of isopropanol present therein). The detergent slurry is at a temperature of about 55° C. and it is sprayed onto the moving bed or "screen" of bentonite particles through an atomizing spray nozzle at a pressure of about 7.5 kg./cm., and the application of the spray takes about 50 minutes, after which tumbling in the agglomerator is continued for an additional 5–30 minutes. During the first part of the agglomeration the mixer turns at about 20 r.p.m. but for the latter half of the agglomeration time its speed is decreased, to about 10 r.p.m. The moisture content of the agglomerated particles is about 11%. In other instances, as when the anionic slurry is diluted with water to improve spraying characteristics (and to speed spray rate) higher moisture content agglomerates are obtained, such as those of moisture contents of about 15% or even more, up to 35%. As long as the agglomerate particles resulting are separate or readily separable, such higher moisture contents may be tolerated but it should be appreciated that they add to any dryer load and therefore require additional drying energy. Consequently, such moisture contents will usually be minimized to the extent that that is practicable. After completion of the agglomeration operation the agglomerated particles, which are of desired particle sizes in the range of 10 to 100 sieves, although some may be larger, are dried to a moisture content of about 6% in an Aeromatic ® G-4 fluidized bed dryer, utilizing inlet air at a temperature of about 90° C. (outlet temperature, at the end of drying, being about 40° C.). The dried product, although in particulate form, includes larger particles too, and such are size reduced, employing a Stokes ® granulator, after which they are screened so as to be of particle sizes in the 12 to 100 or 12 to 120 sieve range, as is desired and practicable, utilizing a suitable Sweco ® screening apparatus. The dried agglomerate particles of desired particle sizes are then returned to the fluidized bed apparatus and are oversprayed with a 27% concentration, in water, of maleicacrylic copolymer (Sokolan CP-5) binder to strengthen the beads, when such is desired. Such spray solution is preferably at room temperature, rather than at elevated temperature, because it has been noted that the beads made are stronger and have harder surfaces when the binder solution is cooler. The overspray is sufficient to provide 10% of the copolymer, based on the anionic detergent content of the agglomerate, and usually such percentage will be in the 5 to 20% range, if the bead strengthener is used. During such spraying excess moisture is removed in the dryer and the product is screened, after which half thereof is oversprayed (again in the fluidized bed apparatus) with a 0.5% aqueous blue dye solution to 0.05% concentration of the dye. Finally, the dyed and undyed agglomerate products are milled and screened to desired particle sizes, so that the resulting bentonite/LAS agglomerate particles analyze 70.1% of bentonite, 21.9% of sodium linear dodecylbenzene sulfonate, 2.2% of copolymer, 0.05% of dye, 1.4% $Na_2SO_4$ and 4.35% of $H_2O$, for the dyed particles, and 70.1% of bentonite, 21.9% of anionic detergent, 2.2% of copolymer, 1.4% of $Na_2SO_4$ and 4.4% of $H_2O$, for the undyed particles. All the particulate agglomerate is of particle sizes in the range of 12 to 120 sieves, and preferably in the range of 12 to 100 sieves, or other preferred size ranges mentioned in this specification, when the appropriate sieves are employed in the screening apparatus, and the bulk density obtained is 0.7 g./cc., which is considered to be satisfactorily high for incorporation in high bulk density built particulate laundry detergents. When tested for frangibility, by a standard test for that property the agglomerate particles are found to be significantly less frangible than control particles of bentonite which contain no LAS.

The particulate builder composition to be blended with the bentonite/LAS agglomerate particles is made by spray drying a 56% solids aqueous crutcher mix which consists of 30.0 parts of sodium tripolyphosphate, 3.0 parts of sodium silicate ($Na_2O$:$SiO_2$=1:2), 14.6 parts of sodium sulfate, 0.13 part of EDTA and 0.21 part of distilbene sulfonate fluorescent brightening agent (identified by applicants' assignee as Stilbene No. 4). Such crutcher mix is spray dried in a conventional countercurrent spray drying tower, normally employed for spray drying anionic detergent composition crutcher mixes, in heated drying air andiin conventional manner, to a moisture content of about 12%. The beads resulting are screened so as to be in the range of $-10 +100$ sieve (U.S. Sieve Series). Because the beads do not contain anionic detergent and contain only a minimum of organic matter they are of comparatively high density, about 0.7 g./cc., as is desired. Such high bulk density spray dried beads are difficult or impossible to produce when a detersive proportion of anionic detergent is in the crutcher mix.

The spray dried base builder beads are then oversprayed with the formula proportion of the liquid state, normally solid nonionic detergent, which is at an elevated temperature (55° C.) when sprayed. The builder beads, the bentonite/LAS agglomerate particles, and the other components of the final composition, including enzyme powder, phosphoric acid ester and other antifoams and buffers, may be mixed in or sprayed onto the mix in an O'Brien or other suitable mixer, or in a fluidized bed mixer and/or dryer, with perfume normally being the most or usually the most downstream additive in such mixer, unless it is subsequently applied. Perborate powder and flow aid may also be added in such mixer or subsequently.

The product resulting is of desired particle size, in the 10 to 100 sievesrange, and it is of comparatively high bulk density, about 0.7 g./cc., so that it may find application as a concentrated particulate detergent product which is especially suitable for use in automatic washing machines which are automatically charged with particulate detergent composition from a dispensing unit or compartment in the machine. When tested for detergency and fabric softening effect the detergent composition is found to be equivalent to or better than comparative products in which similar proportions of detergent, bulder and fabric softening bentonite are present, either as spray dried beads or merely as mixed powders. Any improved effects obtained appear to be attributable to the better dispersibility of the bentonite, which dispersibility appears to be aided by the close proximity to the bentonite of the anionic detergent. Such proximity also may be of desirable assistance in wetting the bentonite particles, which facilitates their ready distribution throughout the wash water and helps to prevent undesired lumping or congealing thereof on washing machine parts and on laundry. The desirable wetting action of the anionic detergent also assists water in removing any adhering bentonite particles and gels from dispenser parts.

In modifications of the described process, normally post-added adjuvants may be agglomerated with the bentonit and LAS but often nonionic detergent, enzyme, bleach perfume and flow aid will not be co-agglomerated. Sometimes drying of the agglomerate and subsequent size reduction and screening may be omitted, as when the agglomeration process can be accurately controlled and the use of excess moisture can be minimized. Other agglomerating apparatuses may be employed, including inclined drum mixers, V-blenders, Lödige mixers, Marumerizers and other equipment adaptable for use as agglomerators, as are known in the art. In some such situations the agglomeration may take place while the agglomerator (or air passing through it) is being heated, at least for the latter portion of the agglomeration, or during the curing or drying part of the process. Instead of only one type of binder being employed, mixtures of binders may be utilized or diferent binders may be applied sequentially during the agglomeration process or subsequently, to assist in agglomeration and/or to improve particle strength and/or hardness. Instead of employing a swellable fabric softening bentonite, less expensive bentonite, such as Italian bentonite which is predominantly non-swelling or poorly swelling calcium and/or magnesium bentonite, may be utilized and a significant proportion, e.g., 5 to 80%, of the sodium tripolyphosphate may be replaced by sodium carbonate, which can react with the bentonite in the wash water to convert it to swellable sodium form, or a sufficient proportion of such sodium carbonate may be included in the bentonite/LAS agglomerate so as to react with the bentonite during agglomeration. Usually the weight of sodium carbonate employed in such agglomeration will be from 5 to 50% of the weightof the bentonite, preferably 10 to 25% thereof. The presence of sodium carbonate does not interfere with the agglomeration process and can assist it materially due to the hydratability of the sodium carbonate, especially when it is charged as soda ash. In a further variation of the invention sodium tallowate or sodium coco-talow soap may be substituted for the LAS or other anionic synthetic organic detergent to make an agglomerate which is useful in the preparation of soap-based detergent compositions. Similarly, other anionic detergents may be used, of types previously mentioned.

The builder composition for mixing with the bentonite/LAS particulate agglomerate, can also be made by agglomeration, granulation, fusion and solidification, followed by size reduction, and by other processes than spray drying. Also, instead of making only built or heavy duty laundry detergent compositions from the invented particulate agglomerates they may also be used as sources of anionic detergent and/or fabric softening agent, for additions, together with conventional detergent compositions, to the wash cycles of automatic washing machines, to improve detergency and fabric softening actions thereof. They may be incorporated in floor and wall cleaners, scouring cleansers, shampoos, dishwashing detergents and various other cleaning products. The invented agglomerates are stable, free flowing and non-caking, and have satisfactorily long shelf lives so that they can be stored for comparatively long periods of time before being compounded with other materials and used. Such desirable properties are attributable in significant measure to the presence of the bentonite which, in addition to acting as a carrier for the anionic detergent and providing a means for making it into a high bulk density particulate bead form, also contributes its detersive and fabric softening properties to compositions in which the invented agglomerate is to be included.

EXAMPLE 2

Instead of employing the O'Brien mixer of Example 1 as an agglomerator, such agglomeration is carried out in a fluidized bed apparatus, like that illustrated in FIG. 3, substantially following the process illustrated in FIG. 4. Thus, to make a product essentially like that produced in Example 1, bentonite powder and 43% solids aqueous LAS slurry, at 45° C. are pre-mixed in a pre-mixer, as illustrated in FIG. 2, which mixer may be of the "turbo-head" type, and the intimately mixed product will then be fed through the surge hopper to the fluidized bed agglomerator-dryer. The balance of the LAS slurry (about half) is then sprayed onto the fluidized bed, together with enough binder solution to satisfactorily help the agglomeration and to produce a strong product. Such binder solution is either a 25 to 30% solution of maleic-acrylic copolymer or a 5% solution of sodium silicate binder and the final content of binder in the agglomerate will be in the range of 0.1 to 3%, depending on the characteristics of the particles obtained, normally with as little binder being present as is needed for satisfactory agglomeration and hardening. The temperature of the air entering the fluidized bed will be about 75° C. during the overspraying operation and the air will exit at about 40° C. but during the subsequent drying operation, in which it is desirable that the moisture content of the agglomerate be reduced to about 5%, the inlet air temperature may be increased to about 95° C. Subsequent dyeing of a portion of the agglomerate particle is with an aqueous solution of dye, and allowance will be made in the fluidized bed agglomerating-drying operations for slightly overdrying the agglomerate so as to allow for absorption of a relatively small proportion of water with the dye.

The agglomerating time in the fluidized bed apparatus may be shorter than that in the apparatus of Example 1, partly due to the pre-mixing of a portion of the LAS slurry (about half) with the bentonite, so the agglomeration time may be as little as twenty minutes, and usually will be in the range of 20 to 40 minutes. Despite such faster production of the desired product its properties will be essentially the same as that made according to the procedure of Example 1, even when production rates of the agglomerate by the fluidized-bed process are as high as 1,500 kg./hr. Although the use of a pre-mixer is desirable to speed the agglomeration process the fluidized bed agglomerator-dryer may be employed without pre-mixing of a portion of the charge to it, but agglomeration time required will usually be increased accordingly. With respect to agglomeration and drying operations conducted in the fluidized bed, it will usually be preferable to limit drying times to the extent feasible so as to minimize any attrition of the agglomerate that could take place during the drying operation.

EXAMPLE 3

The process of Example 1 is carried out as described therein with the modification that a pre-mixer (a Turbomixer) is employed to pre-mix half of the LAS slurry with all of the bentonite, before charging of such mix to the O'Brien mixer-agglomerator. Such pre-mixing helps to speed the agglomeration process, often cutting agglomeration time to one-half or two-thirds of that otherwise required. The products resulting are otherwise essentially the same in their properties.

EXAMPLE 4

Various modifications may be made in the processes of Examples 1-3, wherein other clays and bentonites, such as kaolin, and calcium and magnesium bentonites, are employed as carriers for anionic detergents, and wherein LAS is replaced by sodium lauryl sulfate, sodium coco-monoglyceride sulfate, sodium tetrapropylenebenzene sulfonate, sodium linear tridecylbenzene sulfonate, and sodium paraffin sulfonate, or any mixture thereof, as the anionic detergent. Instead of maleicacrylic copolymer other polymeric binders may be utilized, including polyacrylamide, sodium carboxymethyl cellulose and polyvinyl alcohol, and instead of sodium silicate other inorganic binders can be substituted, such as sodium carbonate and sodium sulfate, with sodium carbonate being preferred when the non-swelling benonites are employed. Additionally, other mixing apparatuses of types previously described may be employed, although those of the fluidized bed and O'Brien types are presently preferred. Proportions of components and concentrations thereof may be varied ±10%, ±20% and ±25%, while still maintaining them within the ranges previously mentioned, and useful products of desired characteristics will be obtainable.

The various products that are obtained and are obtainable by following the processes described herein and illustrated in the above examples are detergent/clay agglomerates and built particulate laundry detergent compositions that are of desired physical properties, including particle size range, comparatively high bulk density, particle strength, lower frangibility, quicker dispersion time in wash water good flowability and satisfactory appearance. They are good detergents and fabric softeners, and are capable of being employed in automatic washing machines which incorporate automatic dispensers for detergent compositions. The described processes, like the compositions, may be varied within the ranges previously given and will still allow production of the high density particulate detergent compositions which contain a detersive proportion of anionic detergent, which is not possible by conventional spray drying techniques. The processes employed to manufacture the novel products of this invention also decrease drying loads on spray towers, and spray tower capacity is often the limiting factor on rate of production of particulate detergent compositions. Without anionic detergent in the crutcher mix drying times can be shortened, due to the lesser evaporation load on the tower and due to the more efficient drying obtainable when essentially inorganic crutcher mixes are being dried. Additionally, tower wall build-ups are minimized, so periodic shutdowns for cleanings occur at less frequent intervals. A further important advantage of the present invention, especially when energy conservation is a paramount consideration, is in the use of less heating fuel. More efficient operation of the spray tower conserves fuel and although heating is employed to evaporate excess moisture from the agglomerate in dryers or agglomerator-dryers, such dryings are at lower temperatures and require less fuel. Therefore, the present processes are less energy intensive than spray drying of the described compositions. Additionally, in those processes wherein spray drying of the inorganic or builder composition component is replaced by agglomeration, spray cooling or other non-tower process for manufacturing satisfactory particulate builder compositions, the processes will require even less energy and will often be more economical, too.

The invention has been described with respect to various illustrations and examples thereof but is not to be considered as limited to these because it is evident that one of skill in the art, having access to the present specification, will be able to utilize substitutes and equivalents without departing from the invention.

What is claimed is:

1. A particulate detergent composition of relatively high bulk density which is composed of agglomerate particles of bentonite and anionic synthetic organic detergent, and which comprises 5 to 40% of anionic synthetic organic sulfonate or sulfate detergent agglomerated with 50 to 95% of betonite particles of such size as to pass a No. 200 sieve, U.S. Sieve Series, and 0 to 20% total of binder, adjuvants and/or water, to particles in the size range of 8 to 120 sieves and a bulk density of at least 0.5 g./cc.

2. A particulate detergent composition according to claim 1 wherein each of the agglomerate particles is composed of individual particles of bentonite of smaller sizes and the anionic detergent is absorbed into said smaller bentonite particles, on the surfaces thereof and between them.

3. A particulate fabric softening detergent composition according to claim 2 wherein the anionic synthetic organic sulfonate or sulfate detergent is a higher alkylbenzene sulfonate, in which the higher alkyl is of 12 to 15 carbon atoms, the bentonite is of such particle sizes as to pass a No. 325 sieve, and the agglomerate particles are of sizes in the range of 10 to 100 sieves, and of a bulk density of at least 0.6 g./cc.

4. A particulate fabric softening detergent composition according to claim 3 wherein the swellable bentonite is fabric softening sodium bentonite, which can be natural sodium bentonite or that produced by conversion of non-swelling bentonite to sodium bentonite, the higher alkylbenzene sulfonate is sodium linear higher alkylbenzene sulfonate in which the higher alkyl is of 12 to 13 carbon atoms, the proportion of bentonite to sodium linear higher alkylbenzene sulfonate is in the range of 1:1 to 10:1, the particle sizes of the agglomerate are in the range of 10 to 80 sieves, and the bulk density thereof is in the range of 0.7 to 1.0 g./cc.

5. A particulate fabric softening detergent composition according to claim 4 wherein the sodium linear higher alkylbenzene sulfonate is sodium linear dodecylbenzene sulfonate, the agglomerate comprises 8 to 30% of such detergent, 60 to 85% of bentonite, 0.5 to 10% of binder, and 1 to 10% of water, and wherein the proportion of bentonite to sodium linear dodecylbenzene sulfonate is in the range of 2:1 to 8:1.

6. A particulate fabric softening detergent composition according to claim 5 which comprises about 22% of sodium linear dodecylbenzene sulfonate, about 70% of sodium bentonite, about 2% of polymeric organic builder and about 4% of water.

7. A built particulate synthetic organic detergent composition which comprises a mixture of a building proportion of a particulate builder for the anionic synthetic organic detergent of the bentonite-detergent agglomerate, which builder particles are in the size range of 8 to 120 sieves, and a detersive proportion of the particulate detergent composition particles of claim 21.

8. A built particulate fabric softening synthetic organic detergent composition according to claim 7 which comprises: 40 to 95% of a particulate builder composition which is of a bulk density of at least 0.5 g./cc. and which comprises 40 to 100% thereof of builder for anionic synthetic organic sulfonated or sulfated detergent, and 0 to 60% of binder, filler, adjuvants and water; and 5 to 60% of a particulate fabric softening detergent composition agglomerate which comprises 5 to 40% of anionic synthetic organic sulfonate or sulfate detergent agglomerated with 50 to 95% of bentonite particles of such size as to pass a No. 200 sieve, and 0 to 20% of binder, adjuvants and water, to particles of sizes in the range of 8 to 120 sieves and of a bulk density of at least 0.5 g./cc., so that the bulk density of the built particulate fabric softening synthetic organic detergent composition is at least 0.5 g./cc.

9. A built particulate fabric softening synthetic organic detergent composition according to claim 8 which comprises: 50 to 90% of a spray dried particulate builder composition which is of a bulk density of at least 0.6 g./cc. and which comprises 40 to 90% of builder or builders for higher alkylbenzene sulfonate detergent, 0 to 40% of filler, 1 to 20% of water and 0 to 35% of adjuvants; and 10 to 50% of particulate fabric softening detergent composition agglomerate which comprises 5 to 40% thereof of higher alkylbenzene sulfonate wherein the higher alkyl is of 12 to 15 carbon atoms, agglomerated with 50 to 95% of swellable fabric softening bentonite particles of such size as to pass a No. 325 sieve, U.S. Sieve Series, and 0 to 20% of binder, adjuvants and water, to particles of sizes in the range of 10 to 100 sieves and of a bulk density of at least 0.6 g./cc., with the bulk density of the particulate built fabric softening synthetic organic detergent composition being at least 0.6 g./cc.

10. A built particulate fabric softening synthetic organic detergent composition according to claim 9 which comprises: 65 to 85% of a particulate builder composition which is of a bulk density in the range of 0.7 to 1.0 g./cc. and which comprises spray dried inorganic builder salt composition beads that comprise 40 to 70% thereof of sodium tripolyphosphate and 2 to 10% of sodium silicate, the proportion of such polyphosphate to such silicate being in the range of 5-20:1, 10 to 35% of sodium sulfate filler, 5 to 20% of water and 1 to 30% of adjuvants; and 15 to 35% of particulate fabric softening detergent composition agglomerate which comprises 5 to 40% thereof of sodium linear higher alkylbenzene sulfonate in which the higher alkyl is of 12 to 13 carbon atoms, agglomerated with 50 to 95% of swellable sodium bentonite particles, and 0 to 15% of binder, adjuvants and water, which agglomerate is of particle sizes such as pass a No. 10 sieve, and of a bulk density in the 0.7 to 1.0 g./cc. range, with the bulk density of the built particulate fabric softening synthetic organic detergent composition being in such 0.7 to 1.0 g./cc. range and with the particle sizes thereof being in the range of 10 to 80 sieves.

11. A built particulate fabric softening synthetic organic detergent composition according to claim 10 which comprises: 70 to 80% of a particulate spray dried builder salt composition which is of a bulk density in the range of 0.7 to 1.0 g./cc. and which comprises 50 to 60% thereof of inorganic builder salt beads that comprise a mixture of sodium tripolyphosphate and sodium silicate in 7-15:1 proportion, 20 to 30% of sodium sulfate, 10 to 20% of water and 2 to 8% of adjuvants; and 20 to 30% of a particulate fabric softening detergent composition agglomerate which is of a bulk density in the 0.7 to 1.0 g./cc. range and which comprises 8 to 30% of sodium linear dodecylbenzene sulfonate, 60 to 85% of bentonite, 0.5 to 10% of binder and 1 to 10% of water, with the bulk densities of the particulate fabric softening synthetic organic detergent composition agglomerate and the built particulate fabric softening synthetic organic detergent composition both being in the 0.7 to 1.0 g./cc. range and with the particle size ranges of both of such compositions and the combined composition being in the 10 to 80 sieves range.

12. A built particulate fabric softening synthetic organic detergent composition according to claim 11 which comprises a mixture of: 70 to 80% of a particulate builder composition which comprises about 50% of sodium tripolyphosphate, about 25% of sodium sulfate, about 5% of sodium silicate, about 5% of nonionic detergent, and about 12% of water; and 20 to 30% of a particulate fabric softening detergent which comprises about 70% of sodium bentonite, about 22% of sodium linear dodecylbenzene sulfonate, about 2% of polymeric organic binder and about 4% of water.

13. A built particulate fabric softening synthetic organic detergent composition according to claim 12 which additionally comprises 10 to 25%, on a total composition basis, of sodium perborate which is mixed with the mixture of builder composition particles and fabric softening detergent composition agglomerate particles.

14. A built particulate fabric softening synthetic organic detergent composition according to claim 13 in which the nonionic detergent is a condensation product of a mole of higher fatty alcohol and 4 to 20 moles of ethylene oxide, or mix thereof with the percentage thereof in the composition being about 3%, and the sodium perborate is sodium perborate tetrahydrate, with the percentage thereof in the composition being about 15%.

15. A process for manufacturing a particulate fabric softening detergent composition of agglomerated particles, according to claim 21, which comprises agglomerating particles of bentonite and an anionic synthetic organic detergent, which is in an aqueous medium, and removing at least some of the water supplied by the aqueous medium from the surfaces of the agglomerated particles by absorption thereof into the agglomerated bentonite - anionic synthetic organic detergent particles, hydration of the bentonite and any other hydratable materials present with it, and/or drying of the agglomerate during formation thereof or afterward.

16. A process according to claim 15 wherein the anionic detergent is an anionic synthetic organic sulfonate or sulfate detergent in aqueous solution and/or dispersion in an aqueous medium, in hich the concentration of said anionic detergent is in the range of 30 to 60%, and wherein the anionic detergent solution and/or dispersion is sprayed onto a moving bed of the bentonite particles, of sizes such that they can pass through a No. 200 sieve, and is agglomerated with such bentonite to particles which contain excess water from the aqueous medium for the anionic detergent, which particles are then dried to remove such excess water, resulting in agglomerated particles of sizes in the No's. 8 to 120 sieves range, which are of a bulk density of at least 0.5 g./cc.

17. A process according to claim 16 wherein the bentonite particles are of sizes smaller than No. 325 sieve, the agglomerated bentonite - anionic synthetic organic detergent particles made are of particle sizes in the range of 10 to 100 sieves, and are of a bulk density of at least 0.6 g./cc., the anionic detergent is a higher alkylbenzene sulfonate in which the higher alkyl is of 12 to 15 carbon atoms, the bentonite is a swellable fabric softening bentonite, the moving bed of bentonite is in a revolving drum-type apparatus, the higher alkylbenzene sulfonate detergent is in aqueous solution, at a concentration in the range of 40 to 50%, which solution is at a temperature in the range of 40° to 80° C., such solution is atomized and is sprayed onto the moving bed of bentonite particles in such atomized form and the agglomerated particles are dried to a moisture content in the range of 4 to 12%.

18. A process according to claim 17 wherein the anionic synthetic organic detergent is sodium linear higher alkylbenzene sulfonate in which the higher alkyl is of 12 to 13 carbon atoms, the proportion of bentonite to sodium linear higher alkylbenzene sulfonate is in the range of 1:1 to 10:1, the bulk density of the agglomerate is in the range of 0.7 to 1.0 g./cc. and the particle sizes thereof are in the range of 10 to 80 sieves, agglomeration is effected in an O'Brien-type or inclined drum-type agglomerator, drying of the agglomerate particles is effected in a fluidized bed dryer, the dried agglomerates are milled in a Stokes-type granulator and are screened to 12 to 80 sieves range, and are then oversprayed with 0.5 to 30%, on a final particulate fabric softening detergent composition basis, of aqueous solution of a strengthening binder, which binder is an inorganic salt selected from the group consisting of sodium silicate, sodium carbonate and sodium sulfate, or a water soluble polymer, which is at a concentration in the range of 1 to 50% in water, in a fluidized bed, without agglomeration to sizes greater than No. 10 sieve, and the particles are dried in such bed to a moisture content in the range of 4 to 12%.

19. A process according to claim 18 wherein at least a portion of the agglomerated particles made are dyed by addition of an aqueous solution of dye to a fluidized bed of such particles in a fluidized bed apparatus, and any excess water applied to the particles with such dye is removed by drying.

20. A process according to claim 19 wherein the dye applied is water soluble blue dye at a concentration in the range of 0.01 to 1% in water and the amount applied is sufficient to add from 0.001 to 0.5% of dye to the detergent composition particles, and to color the surfaces thereof completely.

* * * * *